April 24, 1951 A. O. MICKELSON 2,550,159
PIPE HANDLING GEAR
Filed Jan. 8, 1945 2 Sheets-Sheet 1
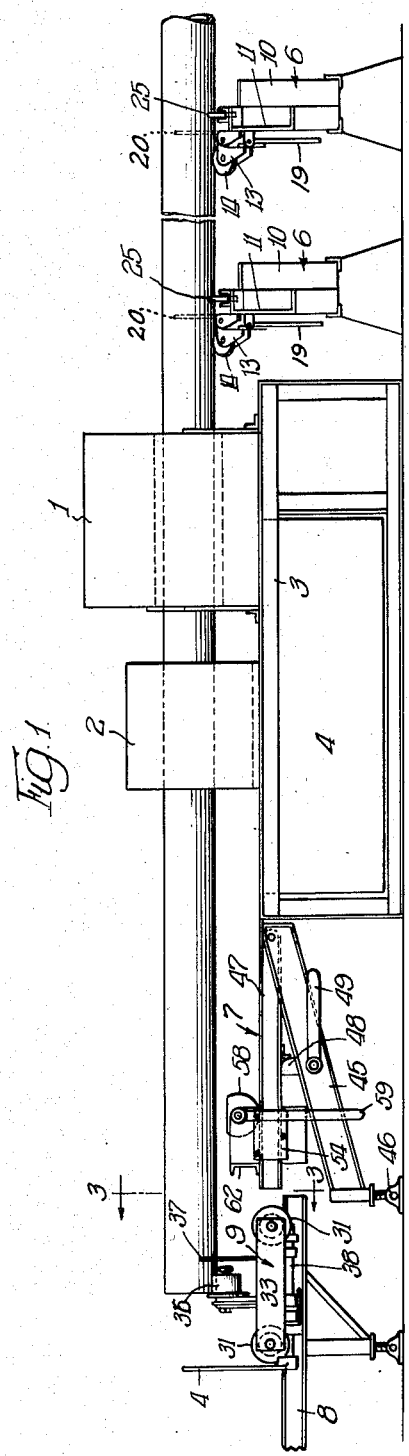
INVENTOR.
Alfred O. Mickelson,
BY
George H. Simmons
Atty.

April 24, 1951
A. O. MICKELSON
2,550,159
PIPE HANDLING GEAR
Filed Jan. 8, 1945
2 Sheets-Sheet 2
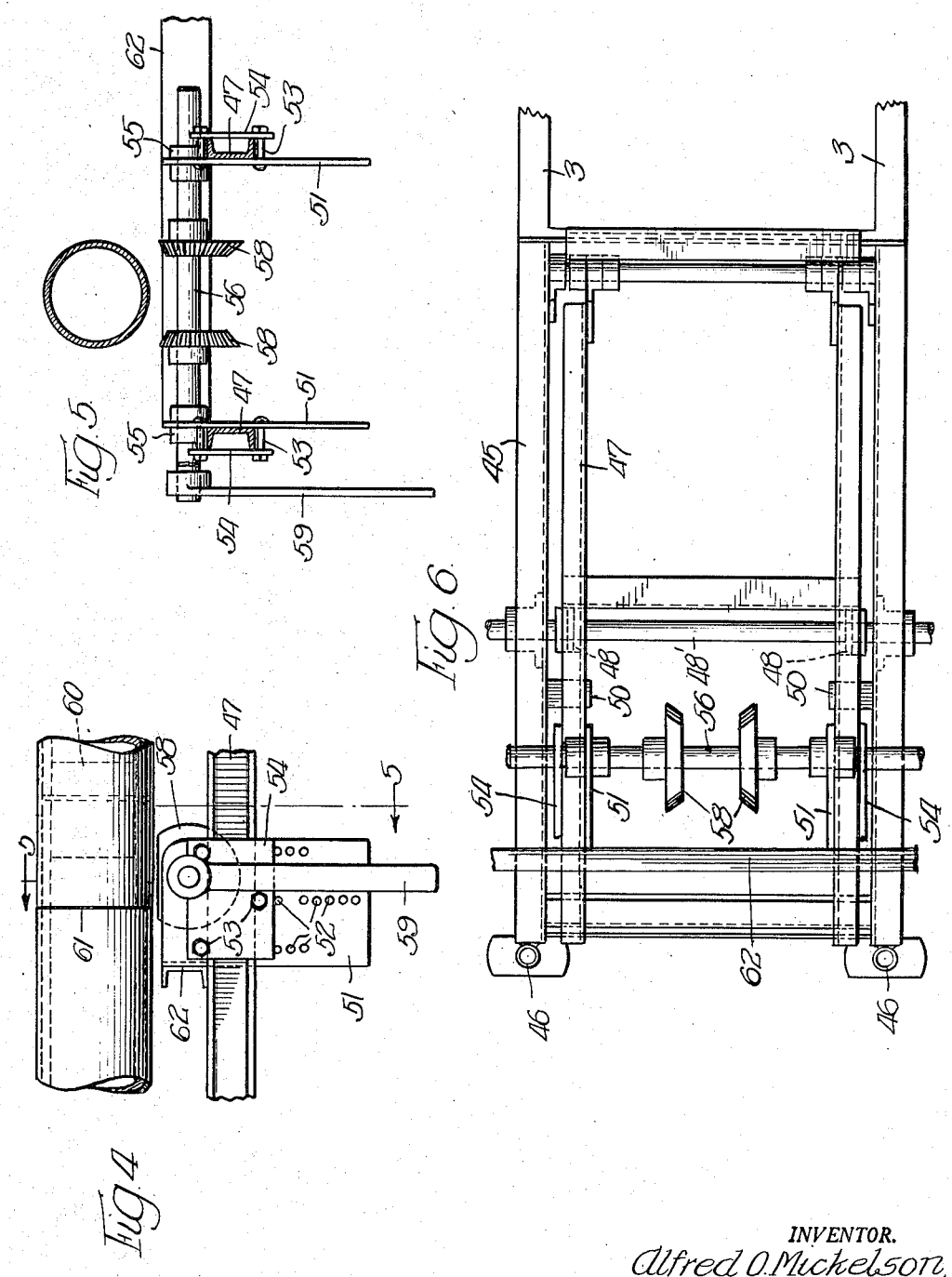
INVENTOR.
Alfred O. Mickelson,
BY
George H. Simmons
Atty.

Patented Apr. 24, 1951

2,550,159

UNITED STATES PATENT OFFICE 2,550,159

PIPE HANDLING GEAR

Alfred O. Mickelson, Elmhurst, Ill., assignor to Pipe Line Service Corporation, Franklin Park, Ill., a corporation of Illinois Application January 8, 1945, Serial No. 571,941

4 Claims. (Cl. 29—239)

This invention relates to pipe handling gear and has for its principal object the provision of a new and improved gear of this type.

It is a main object of the invention to provide a new and improved gear for handling pipes into and out of a pipe coating machine which simultaneously rotates and longitudinally advances the pipe.

It is a further object of the invention to provide a pipe handling gear that permits handling pipe into and out of a pipe coating and wrapping machine with a minimum of man power.

Another object of the invention is to provide a gear for uncoupling from a trailing pipe a leading pipe, one end of which is supported by the coupling to the trailing pipe.

Still another object of the invention is to provide a pipe handling gear composed of a plurality of individual self-contained units which can be set up and aligned at low cost.

Still another object of the invention is to provide a low cost pipe handling gear that is of sturdy construction capable of withstanding hard usage over a long period of time with a minimum of maintenance.

Further objects of the invention not specifically mentioned here will be apparent from the detailed description and claims which follow, reference being had to the accompanying drawings in which a preferred embodiment of the invention is shown by way of example, and in which:

Figure 1 is a side elevational view showing the preferred embodiment of the invention.

Figure 2 is a side elevational view of a pipe dolly drawn to an enlarged scale.

Figure 3 is an end elevational view of the dolly taken substantially along the line 3—3 of Figure 1 looking in the direction of the arrows.

Figure 4 is a fragmentary elevational view of the pipe uncoupling mechanism.

Figure 5 is a cross sectional view taken substantially along the line 5—5 of Figure 4, looking in the direction of the arrows, and Figure 6 is a plan view of pipe unloading mechanism.

Pipe coating or pipe coating and wrapping machines usually comprise a propelling mechanism such as, for example—the propelling mechanism shown in Patent 2,048,557 issued to Mickelson and Duaei July 21, 1936, which rotates and simultaneously advances the pipe longitudinally so that a point on the outer surface of the pipe travels in a helical path. A coating shoe such as, for example—the shoe shown in the Patent 2,147,308 issued to Mickelson and Duaei February 14, 1939, is employed to apply a coating of protective enamel to the pipe after which, in some instances, one or more layers of felt or paper are applied to the pipe in the manner explained in the first of the above mentioned patents.

Pipes varying in diameter from ½ inch up to 12 or 14 inches are coated in this manner and in the case of the larger pipes, the problem of moving the pipes into and out of the coating machine has been the subject of much prior art, of which I am aware. The prior art discloses various rather complicated arrangements for lifting and moving the pipe longitudinally to feed it into the machine, and also equally complicated devices for removing the coated pipe from the machine. These prior art devices have required electric or hydraulic or pneumatic power and have been very expensive to construct, install, operate and maintain. The present invention provides a new and improved method of handling pipe into and out of such coating machine and employs devices which are manually operated, and which can be constructed as sturdy, serviceable units, and can be installed, operated and maintained at low cost.

In its preferred form the instrumentalities of the present invention are relatively small independent units capable of being easily transported, set up and properly aligned with respect to each other and to the coating machine. The arrangement is far more flexible than the prior art devices and enables the invention to be employed in cases where a coating machine is set up out in the field alongside a railroad siding and the pipe coated and wrapped as it is unloaded from cars on the siding.

Pipes vary in length from 20 feet for the smaller sizes up to 50 feet for the larger sizes, and in the case of larger pipes it is difficult, if not impossible, for two men to lift a length of pipe. However, two men can easily roll a large pipe and it is customary to provide skids that are substantially parallel and disposed far enough apart to support the pipes in a substantially horizontal position.

Adjacent these skids and the incoming end of the machine, in the preferred embodiment, are a plurality of spaced apart pipe stands, usually two or three, onto which the pipe is rolled. These pipe stands are equipped with rollers that are set to permit easy movement of the pipe in a longitudinal translatory movement. This movement permits coupling the leading end of the pipe onto the trailing end of the preceding pipe already in the coating machine. The pipe stands are also equipped with rollers that are set at an angle such that the pipe rolls thereon during the simultaneous rotary and longitudinal movement imparted to it by the coating machine.

Adjacent the outgoing end of the machine is a trackway upon which is mounted a dolly that contains pipe supporting rollers which engage the leading end of the pipe as it emerges from the machine, the dolly being pushed along the trackway by the advancing pipe. As soon as the coupling between the preceding and succeeding pipes has cleared the coating machine that machine is stopped and a manually operable uncoupling mechanism is manipulated to move the preceding pipe longitudinally to uncouple it from the trailing pipe then in the machine.

Freshly coated and wrapped pipe must be handled carefully to avoid damage to the coating before it has become fully cooled and set, and the dolly and uncoupling mechanism are provided with rolling skids onto which the pipe is lowered to permit rolling it out of the machine. In order to permit subsequent welding of the pipe in a pipe line or coupling it therein by usual pipe couplers, the coating is cut back for a distance of a foot or more from each end of the pipe. These rolling skids on the dolly and uncoupling mechanism engage the pipe in these regions so that damage to the main coating is avoided.

It is the usual practice to provide rolling skids adjacent the outgoing end of the coating machine which skids are heavily padded so that a freshly coated pipe may be rolled onto the skids and cooled thereon without damage to the coating.

The method of the present invention avoids any lifting of the pipe by confining the pipe movements in the handling gear to rolling and lowering the pipe and it has been found that even the heaviest pipes can be handled with substantially fewer men than has been possible with the pipe handling gear of the prior art, of which I am aware.

Referring now to the drawings in more detail: In Figure 1 there is shown a conventional coating machine comprising a propelling mechanism 1 and coating mechanism 2, both of which are mounted on a framework 3 that carries a tank 4 in which the coating material is maintained at proper application temperature. Located adjacent to the incoming end of the coating machine are a plurality of spaced apart pipe stands 6, which support the pipe that is to be coated.

Pivotally mounted on the coating machine frame 3 at the outgoing end of the machine is an uncoupling mechanism 7, and extending outwardly therefrom and in alignment with the pipe is a trackway 8 upon which runs a pipe supporting dolly 9.

Pipe stand 6 forms no part of the present invention. It is sufficient to note here that each stand 6 consists of a frame 10 upon which is mounted a bracket 11, to which bracket a wheel carriage 13 is pivotally connected and supports a roller 14 which supports the pipe for movement longitudinally of its axis. The stands are also equipped with a pair of rollers 25 which are adjustable to the angle of the helical pitch of the pipe when rotated, and simultaneously advanced longitudinally of its axis. Pipes are rolled onto these stands and supported by rollers 14 during the coupling operation, brackets 20 on the stands preventing overshooting during the rolling operation. After the pipe has been coupled and simultaneous rotary and longitudinal movements are to begin, the brackets 13 are rotated on their pivots through cam means operated by lever 19 to lower the pipe onto rollers 25.

With this arrangement and with suitable couplings of the pipe shown in Patent #2,077,769, issued to Postlewaite April 20, 1937, two men can handle the larger sizes of pipe without difficulty.

As will be seen in Figures 1, 2 and 3, the track 8 comprises spaced apart rails 30 which are engaged by flanged wheels 31 that are on axles 32, which are journaled in the frame 33 of the dolly.

Mounted on the frame of the dolly in suitable guides 34 is a mounting plate 35 upon which are journaled a pair of flanged supporting rollers 36. The leading end of a pipe emerging from the coating machine is engaged by these rollers 36 which support it, and as the pipe moves forward it pushes the dolly along track 8 away from the coating machine.

Also mounted on the frame of the dolly, running transversely thereof, is a rolling skid 37 which is disposed below the upper or pipe engaging surfaces of the rollers 36. Journaled in suitable brackets on the dolly frame is a shaft 38 which carries a cam 39 that engages the mounting plate 35. Shaft 38 also carries a lever 40 by which the shaft is rotated to lower the plate and with it rollers 36, thereby lowering the end of the pipe onto the rolling skid 37.

As soon as the coupling between a preceding and trailing pipe has reached the position in which it is shown in Figure 4, the machine is stopped momentarily preparatory to uncoupling the completed pipe from the trailing pipe. The uncoupling mechanism shown in Figures 1, 4, 5 and 6 comprises a main frame 45, one end of which is fixed to the frame 3 of the coating machine by suitable means, and the other end of which is supported on a height adjusting mechanism 46. Pivotally supported in the frame 45 is a sub-frame 47 that is supported on cams 48 that are mounted upon a shaft 48' journaled in the frame 45. A suitable lever 49 is mounted on this shaft to permit operating the cam to raise and lower the sub-frame onto brackets 50 on frame 45 by swinging it on its pivot.

During the coating of a pipe the sub-frame is lowered to increase the clearance between it and the pipe, since there is considerable sag in a 40 or 50 foot pipe. When the machine has been stopped as above, lever 49 is operated to raise the sub-frame into the position in which it is shown in Figure 1.

Mounted upon the sub-frame members 47 are plates 51 which contain a plurality of groups of holes 52 through which bolts 53 may be extended to adjust the position of the plates vertically with respect to the sub-frame members. The bolts 53 extend through clamp plates 54 which hold the plates 51 in position when the bolts are tight.

Mounted in suitable journals 55 on the plates 51 is a shaft 56 upon which are mounted a pair of beveled gear segments 58. Segments 58 are adjustable longitudinally to the shaft to adjust the mechanism of pipes of various sizes. Shaft 56 also carries a lever 59 through which it may be rotated.

As will be seen in Figure 4 when the machine is stopped with the coupler 60 adjacent the uncoupling mechanism and the sub-frame 47 is elevated, there is an appreciable clearance between the fragmentary gears 58 and the pipe. A rotation of the gears counter-clockwise, Figure 4, brings these gears into engagement with the pipe, raising it slightly and then moving it longitudinally as the rotation is continued. The point of engagement of gears 58 with the pipe is between the line 61 and the end of the pipe, and since the coating on the pipe is to be cut away to the line 61 to permit coupling the pipe in a pipeline, any damage to the coating that may result from engagement of the gears 58 therewith is of no moment.

Mounted upon plates 51 and extending transversely of the sub-frame 47 is a rolling skid 62 and during the latter part of the rotation of gears 58 the pipe is lowered onto this skid, the line 61 being beyond the skid so that damage to the coating by this contact with the skid is immaterial. The pipe having thus been lowered onto the rolling skid 37 on the dolly and onto the rolling skid 62 on the uncoupling mechanism, it can now be rolled out of the machine and onto suitable drying skids, not shown, where it is allowed to remain until the coating has fully cooled and hardened.

Rolling skid 37 in the dolly is mounted therein so that it may be reversed. In Figure 3 the skid is fixed so that the pipe is rolled to the left to remove it from the dolly. In certain instances it may be advantageous to roll the pipe to the right, Figure 3, in which case rolling skid 37 will be turned end for end. Also, on the pipe stands stop 20 can be moved from one side of the stand to the other. As shown, in Fig. 1 stop 20 is on the back side of the pipe and when the pipe is to be fed onto the stands from this back side, the stop and lever 19 can be moved to the front side. Rolling skid 62 and levers 49 and 59 on the unloading mechanism may also be changed from one side to the other as required.

The method of the present invention is possessed of many advantages. Heavy pipes are rolled and lowered so that even the heaviest may be handled by two men. The apparatus employed is composed of a plurality of units each of which can be constructed as a sturdy device at low cost. The mechanism is far more portable than the pipe handling gear of the prior art, and is therefore better suited to meet the conditions encountered by the pipe coater. The devices are simple to operate, and can be maintained in good operating condition economically.

While I have chosen to illustrate my invention by showing and describing a preferred embodiment, I have done so by way of example only, as there are many modifications and adaptations which can be made by one schooled in the art within the teachings of the invention.

Having thus complied with the statutes and shown and described a preferred embodiment of my invention, what I consider new and desire to have protected by Letters Patent, is pointed out in the appended claims. What is claimed is:

1. In a pipe handling gear, a frame, a sub-frame pivotally mounted in said frame; means for swinging said sub-frame around said pivot mounting to raise and lower the same, a rolling skid disposed transversely of said sub-frame, a shaft journaled in said sub-frame and extending transversely thereof, means for rotating said shaft, and means on the shaft operated by a rotation thereof for engaging a pipe, moving the same longitudinally of the sub-frame and then lowering the same onto said rolling skid.

2. In a pipe handling gear, an uncoupling mechanism comprising, a frame, a sub-frame pivoted to said frame adjacent one end thereof and extending therefrom towards the other end of the frame, cam means on said frame for raising and lowering said sub-frame, a rolling skid, disposed at the free end of and extending transversely of the sub-frame, a shaft journaled in and disposed transversely of said sub-frame, segments of beveled gears fixed upon said shaft and operable upon rotation of the shaft to engage a pipe, move the same longitudinally of the sub-frame and then lower the pipe onto the rolling skid.

3. In a pipe handling gear for uncoupling from a trailing pipe a leading pipe whose trailing end is supported by said trailing pipe; a shaft, means for supporting said shaft in juxtaposition to the pipe with the axis of the shaft at right angles to the axis of the pipe; a pair of gear segments fixed on said shaft; and means for rotating the shaft to engage said segments with the pipe first to transfer the support of the engaged end of the pipe from the trailing pipe to the shaft and then to move the engaged pipe longitudinally of its axis and out of engagement with said trailing pipe.

4. A gear for uncoupling a leading pipe from a succeeding pipe which is supporting the trailing end of the leading pipe comprising: a shaft disposed at right angles to the axes of the pipes and therebeneath; a pair of segmental gears fixed in spaced apart relation on said shaft; means for rotating said shaft and gears, said gears engaging the leading pipe during the initial portion of the rotation to transfer the support of the engaged end of the leading pipe to the shaft and then moving the engaged pipe longitudinally of its axis during continued rotation; and a rolling skid disposed below the pipe and extending transversely of the axis of the pipe, said gear segments lowering the engaged pipe onto said skid during the final portion of said rotation.

ALFRED O. MICKELSON.

REFERENCES CITED

The following references are of record in the file of this patent:

UNITED STATES PATENTS

| Number | Name | Date |
| --- | --- | --- |
| 1,791,793 | Chambers | Feb. 10, 1931 |
| 1,883,964 | Kramer | Oct. 24, 1932 |
| 1,911,601 | Boughton | May 30, 1933 |
| 1,919,186 | Cooper | July 25, 1933 |
| 1,927,847 | Resser | Sept. 26, 1933 |
| 2,000,351 | Paul | May 7, 1935 |
| 2,010,820 | Larson | Aug. 13, 1935 |
| 2,086,160 | Gotthardt | July 6, 1937 |
| 2,166,608 | Postlewaite | July 18, 1939 |
| 2,166,609 | Putnam | July 18, 1939 |

FOREIGN PATENTS

| Number | Country | Date |
| --- | --- | --- |
| 401,975 | Great Britain | Nov. 23, 1933 |